United States Patent [19]

Stiglic et al.

[11] Patent Number: 5,050,376
[45] Date of Patent: Sep. 24, 1991

[54] CONTROL SYSTEM FOR DIESEL PARTICULATE TRAP REGENERATION SYSTEM

[75] Inventors: Paul M. Stiglic, Torrance; Brian C. Gabelman, Los Angeles; James A. Hardy, Playa Del Rey, all of Calif.

[73] Assignee: Allied-Signal Inc., Morristown, N.J.

[21] Appl. No.: 477,019

[22] Filed: Feb. 8, 1990

[51] Int. Cl.$^5$ ............................................. F01N 3/02
[52] U.S. Cl. ..................................... 60/274; 60/280; 60/286
[58] Field of Search ................. 60/274, 276, 286, 285, 60/280, 324

[56] References Cited

U.S. PATENT DOCUMENTS

| | | |
|---|---|---|
| 4,471,611 | 9/1984 | Watanabe . |
| 4,677,823 | 7/1987 | Hardy . |
| 4,715,179 | 12/1987 | Muller ............................... 60/274 |
| 4,835,963 | 6/1989 | Hardy ............................... 60/274 |
| 4,884,398 | 12/1989 | Morita et al. . |

FOREIGN PATENT DOCUMENTS

| | | |
|---|---|---|
| 0260031 | 3/1988 | European Pat. Off. . |
| 59-194020 | 11/1984 | Japan . |
| 60-90914 | 5/1985 | Japan . |
| 79814 | 4/1986 | Japan ................................. 60/276 |
| 201309 | 8/1988 | Japan ................................. 60/286 |

OTHER PUBLICATIONS

SAE Papers 900109, 1990, 890403, 1989, 890399, 1989, 880004, 1988, 860293, 1986, 860136, 1986.

Patent Abstracts of Japan, vol. 13, No. 484 (M886), Nov. 2, 1989 & JP, A, 1190955 (Mazda) Aug. 1, 1989.
Patent Abstracts of Japan, vol. 9, No. 155 (M-392) Jun. 29, 1989 & JP, A, 6030413 (Mitsubishi) Feb. 16, 1985.
Patent Abstracts of Japan, vol. 11, No. 392 (M653), Dec. 22, 1990 & JP, A, 62159713 (Toyota) Jul. 15, 1987.
Patent Abstracts of Japan, vol. 11, No. 397 (M-655), Dec. 25, 1987 & JP, A, 62162763 (Toyota) Jul. 18, 1987.

*Primary Examiner*—Douglas Hart
*Attorney, Agent, or Firm*—Ken C. Decker; William N. Antonis

[57] ABSTRACT

A control system for regenerating a particulate trap in the exhaust system of a diesel engine includes control logic which controls the air/fuel ratio of the engine by operating a backpressure valve in the engine exhaust system to provide a proper amount of excess oxygen to permit efficient combustion of the particulate content of the trap, but to avoid rapid and damaging combustion rates. Actual engine air/fuel ratio is compared to a commanded air/fuel ratio, and the position of the backpressure valve is adjusted accordingly. The commanded air/fuel ratio is ratcheted upwardly or downwardly once in a predetermined time period in response to a temperature error signal between exhaust gas temperature sensed in the engine exhaust manifold and a predetermined commanded temperature. An override is provided to permit the vehicle operator to override regeneration when power is required from the engine, and a low power cut-off is provided to suspend regeneration when the engine is operated for a period of time at low power conditions where regeneration is inefficient.

18 Claims, 4 Drawing Sheets

CONTROL SYSTEM FOR DIESEL PARTICULATE TRAP REGENERATION SYSTEM

This invention relates to a particulate trap system for use in the exhaust system of an internal combustion engine, such as a diesel engine to trap particulate matter which would otherwise be emitted to the atmosphere.

Until recently, there have been no governmental standards mandating controls for the emission of contaminants from diesel engines. Such contaminants are called particulate matter and consist of unburned hydrocarbons, soot and sulfates. In addition to being unsightly, the particulates may pose a health hazard. Accordingly, it has been proposed that such particulates be captured within a trap within the exhaust system and then burned to regenerate, or clean, the trap. In order to burn the particulate, it is necessary to increase the temperature in the trap. Trap regeneration systems have been proposed, for example, in U.S. Pat. No. 4,677,823. This patent uses an auxiliary burner to raise the temperature within the trap to a level high enough to assure combustion of the particulate matter. However, auxiliary burners of this type have several disadvantages, which include the use of additional fuel, the pumping of the fuel to the trap, and injection of the fuel to support combustion.

Another particulate trap regeneration system is disclosed in U.S. Pat. No. 4,835,963. This system uses a backpressure valve in the exhaust system which may be closed to increase backpressure on the engine, thereby raising the temperature of the exhaust gas to a predetermined level sufficient to burn the particulate matter in the trap. However, by using a predetermined temperature to burn the particles in the trap, other problems are introduced. The engine must be operated at an air/fuel ratio such that sufficient excess oxygen under normal engine operating conditions is provided in the exhaust gas stream to properly burn the particulate, but not enough excess oxygen to promote a rapid and damaging burning. Since the air/fuel ratio may vary considerably, depending upon the power demand on the engine and other factors, merely selecting a temperature high enough to assure combustion may result in incomplete or insufficient combustion of the particulate, because insufficient excess oxygen was provided to assure complete combustion. At other times sufficient excess oxygen could be present to promote a rapid or "runaway" regeneration which could damage or destroy the particulate trap.

Accordingly, the present invention proposes that a backpressure valve be operated to maintain the air/fuel ratio of the engine at an air/fuel ratio providing sufficient excess oxygen to provide optimum combustion of the particulate matter. A commanded air/fuel ratio is used to drive the controller for the backpressure valve, so that the backpressure valve is continually adjusted to drive the error between the commanded air/fuel ratio and the actual air/fuel ratio to zero, thereby assuring conditions for optimum particulate combustion. While the temperature resulting from using the commanded air/fuel ratio may vary over a fairly wide range due to changes in engine operating conditions, the commanded air/fuel ratio is adjusted to maintain the temperature of the exhaust gas at a level low enough that damage to the engine components does not result. Futhermore, temperature must be sensed by a thermocouple which is an inherently slow reacting device. The present invention, by controlling air/fuel ration, reacts more quickly than prior art controls based upon temperature sensing.

Therefore, the temperature used to adjust the commanded air/fuel ratio in the present invention is the temperature in the exhaust manifold of the engine upstream of the turbocharger. This is the warmest part of the engine exhaust, and control based on this temperature assures that damage to the engine components will not result. Accordingly, the air/fuel control is a high performance control that maintains the air/fuel ratio as close to the commanded value as possible, while the temperature control is a lower performance control in which the commanded value of the air/fuel ratio is ratcheted up or down by predetermined amount in a predetermined time period to control temperature. In addition, an override is provided so that when the accelerator is depressed, requesting a higher power, regeneration of the particulate trap is momentarily overridden to provide the requested power.

Another advantage of controlling regeneration based on the air/fuel ratio is that "runaway regenerations" are prevented. In systems in which the excess oxygen is not controlled, combustion of particulate matter in the trap can take place at a very rapid rate and produce temperatures which quickly destroy the trap. The system according to the present invention closely controls the air/fuel ratio over much of the engine operating envelope to assure that there is not enough oxygen to support the runaway regeneration conditions with the attendant damaging temperature.

These and other advantages of the present invention will become apparent from the following specification, with reference to the accompanying drawings, in which.

Figure 1:
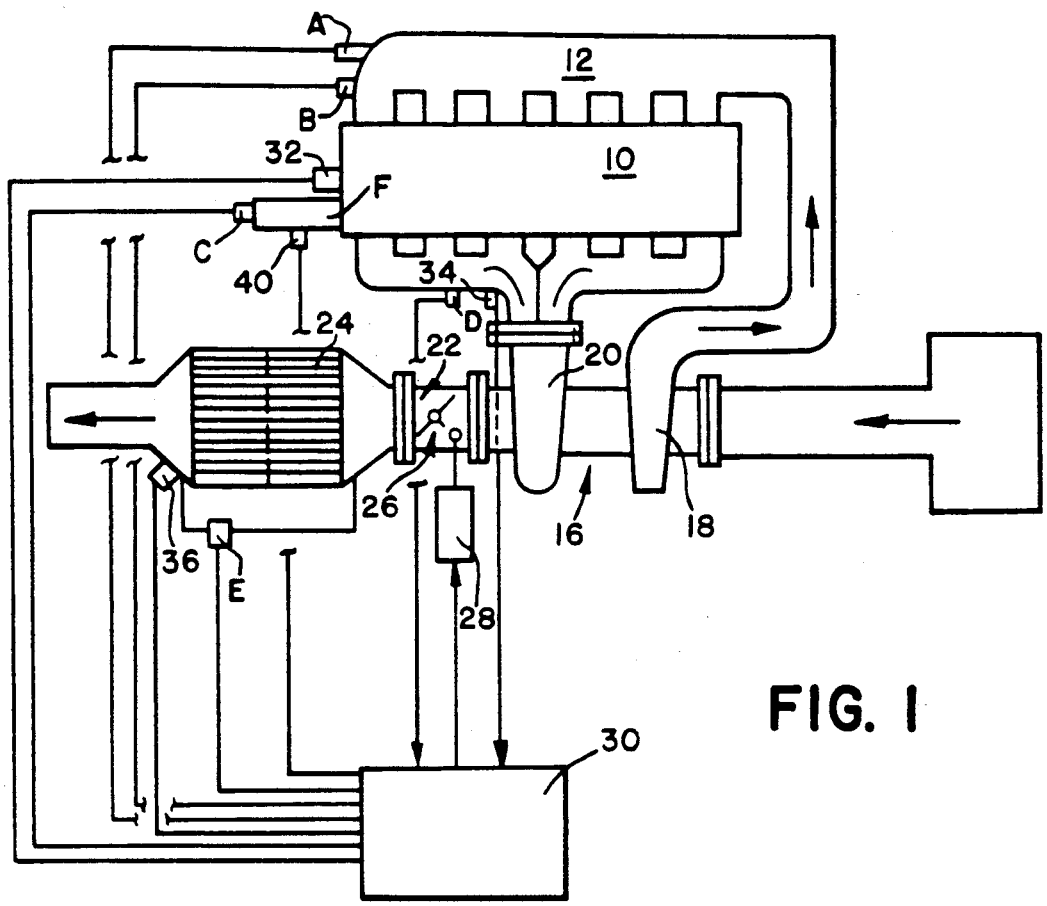
FIG. 1 is a schematic of the overall configuration of the system.

Referring now to the drawings, a combustion engine 10, such as a diesel engine, includes an induction manifold 12 and an exhaust manifold 14. Although the engine 10 may be naturally aspirated, the engine 10 is preferably equipped with a turbocharger generally indicated by the numeral 16. The turbocharger 16 includes a compressor section 18 which compresses ambient air which has been filtered by a conventional air filter illustrated schematically as at 19 and forces the pressurized ambient air into the induction manifold 12. The compressor section 18 is powered by conventional turbine section 20 of the turbocharger 16, which uses exhaust gasses from the exhaust manifold 14 to turn a compressor wheel (not shown) located within compressor section 18, which is mounted on a common shaft (not shown) with a turbine wheel (not shown) within the turbine section 20. Exhaust gasses communicated through the turbine wheel turn the aforementioned shaft at a relatively high speed, to thereby operate the compressor wheel and to pressurize the ambient induction air communicated through air filter 19 in a conventional manner.

Exhaust gasses, after being fed through the turbine section 20, are discharged into the engine exhaust system generally indicated by the numeral 22. Within the exhaust system 22 is a particulate trap 24, of conventional design. The particulate trap 24 is essentially a filter made from very high temperature resistant material which traps particulate matter entrained within the exhaust gasses discharged from the engine 10 and communicated through the exhaust system 22. The particulate trap 24, since it is designed to capture the particulate matter entrained within the exhaust gasses produced by the engine 10, must be periodically regenerated to limit exhaust back pressure, to preserve engine efficiency. According to the present invention, the trap 24 is regenerated by periodically changing the conditions of the exhaust gas to provide sufficient excess oxygen and temperature to support combustion of the particulate matter entrained within the trap 24. Proper temperature and excess oxygen are assured by adjusting the air/fuel ratio of the engine 10 by operation of a backpressure valve generally indicated by the numeral 26 in the engine exhaust system 22.

Operation of the backpressure valve 26 changes the backpressure on the engine 10, thereby changing the air/fuel ratio at which engine 10 operates. As illustrated schematically in FIG. 1, the backpressure valve 26 is a simple butterfly valve mounted within the exhaust system 22. An actuator, indicated schematically as at 28, responds to electrical signals generated by microprocessor 30 to adjust the position of the valve 26, thereby varying the flow of exhaust gasses through the exhaust system 22 to change the backpressure on the engine 10. Microprocessor 30 generates a signal which is communicated to the actuator 28 and receives inputs from an engine speed sensor 32, a temperature sensor 34, which provides a signal representative of the temperature of the exhaust gasses in the exhaust manifold 14.

An oxygen sensor 36, may be used to calculate actual air/fuel ratio. However, appropriate oxygen sensors are relatively expensive. Accordingly, it is preferred that the air/fuel ratio be calculated from other engine parameters as will be hereinafter described. Torque produced by the engine is also calculated to determine when regeneration should be suspended, as will be described hereinafter with reference to FIG. 5. To calculate these parameters, inlet manifold temperature and pressure are measured by the sensors 35 and 37 respectively, fuel rack position is sensed by sensor 39 and throttle position is measured from throttle position sensor 40 which is under the control of the vehicle operator.

As will be seen, it is necessary to calculate engine torque, which is a function of engine brake horsepower and engine speed (rpm). These calculations are performed by the microcontroller 30. Engine brake horsepower is given by the equation:

$$BHP = BMEP*DISP*RPM/792,000 \qquad (1)$$

Where:
BMEP = Brake Mean Effective Pressure, PSI
DISP = Engine Displacement, IN$^3$ And:

$$BMEP = IMEP - FMEP - PMEP \qquad (2)$$

Where:
IMEP = Indicated Mean Effective Pressure, or the Mean Effective Pressure developed by the gas during the compression and expansion strokes, PSI.
FMEP = Mean Effective Pressure required to overcome friction, PSI.
PMEP = Approximately the difference between the exhaust and intake manifold pressures (PA − PB), PSI.
PA = Intake Manifold Pressure, PSIA
PB = Exhaust Manifold Pressure, PSIA
FMEP can be approximated by the equation, $$FMEP = 15 + .0000549*(PS)^{1.6} \qquad (3)$$

Where:

PS = Piston Speed, ft./min.
= 2*STROKE*RPM/12
STROKE = Piston Stroke, IN

Then:

$$FMEP = 15 + .0000549*\left(\frac{STROKE*RPM}{6}\right)^{1.6}$$

Combining these equations yields, $$BHP = IMEP - (PA - PB) -$$

$$\left(15 + .0000549*\left(\frac{STROKE*RPM}{6}\right)^{1.6}\right)*DISP*RPM/792,000$$

A map of the relationship between IMEP, RPM and WF can be developed from test data.

Figure 7:
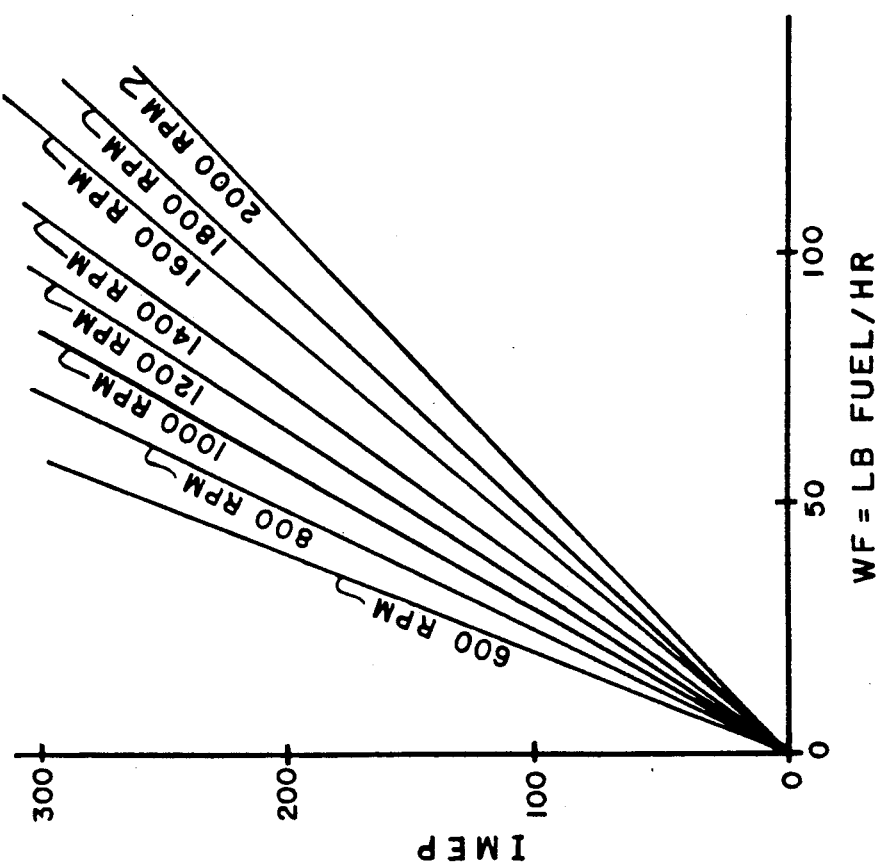
FIG. 7 is a map of fuel flow and Indicated Mean Effective Pressure (IMEP) for a typical diesel engine.

The parameters necessary for calculating BHP are then, RPM, WF, PA and PB. IMEP is obtained from FIG. 7, which can be stored in the computer in matrix form.

Torque is determined as follows:

$$T = 5252*BHP/RPM, \; FT-LB \qquad (6)$$

In order to determine the actual air/fuel ratio, both air flow and fuel flow must be calculated. Air flow is calculated from the equation:

$$WA = \frac{\rho*\eta*RPM*DISP}{1728*2}$$

Where:
WA = Air Flow, Lb/Min
$\rho$ = Intake Manifold Air Density, Lb/Ft$^3$
$\eta$ = Volumetric Efficiency
RPM = Engine RPM
DISP = Engine Displacement, in$^3$
$\rho$ is calculated by the equation:

$$\rho = 144 \; PA/(53.3 \; T)$$

Figure 8:
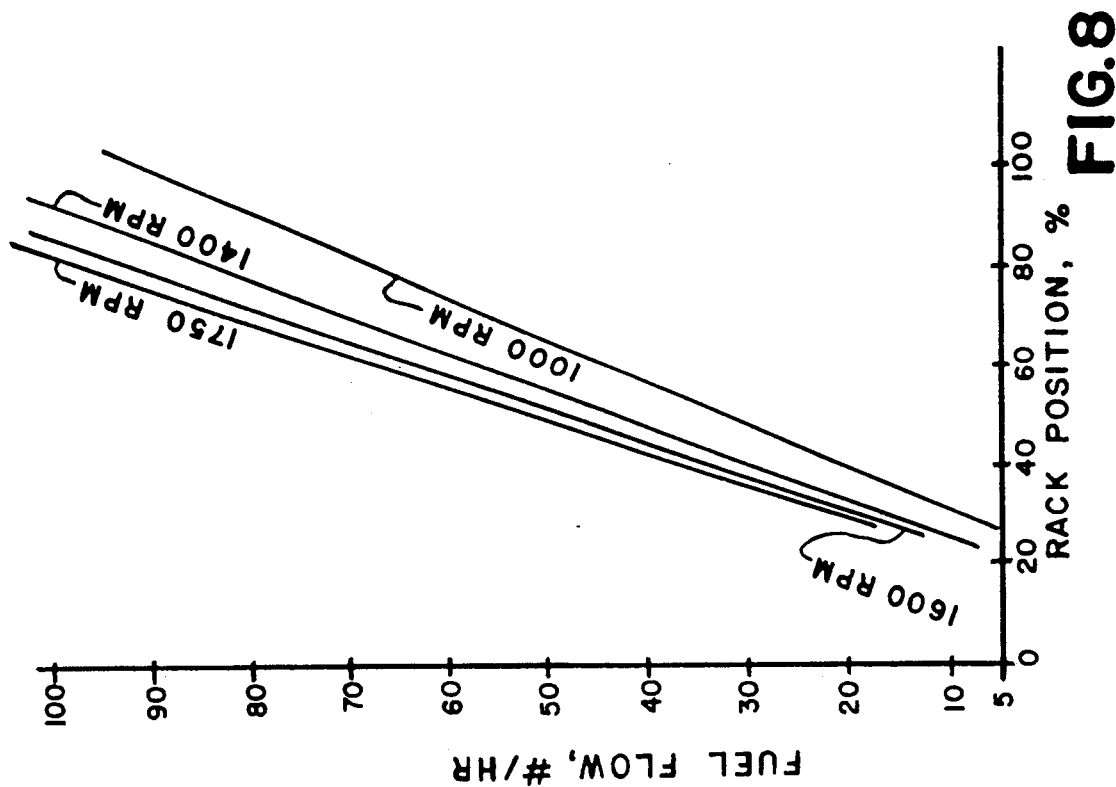
FIG. 8 is a map of rack position and fuel flow for a typical diesel engine.

Where:
PA = Intake Manifold Pressure, PSIA
T = Intake Manifold Temperature, DEG.R
$\eta$ is determined from a look-up table or array that is generated from test data on the engine. It is primarily a function of engine RPM and the ratio of PA/PB. Fuel flow is calculated by sensing fuel pump rack position and RPM and then using calibration curves, such as those shown in FIG. 8. Since rack position, or its equivalent solenoid on-time, are available with electronic engine controls and RPM is available on all engines, the fuel flow signal is essentially "free" information to the particulate system. Using the computed air flow and the available fuel flow information, air fuel ratio is calculated as follows:

$$\text{AIR/FUEL} = \frac{W_A}{W_f} * 60$$

Figure 2:
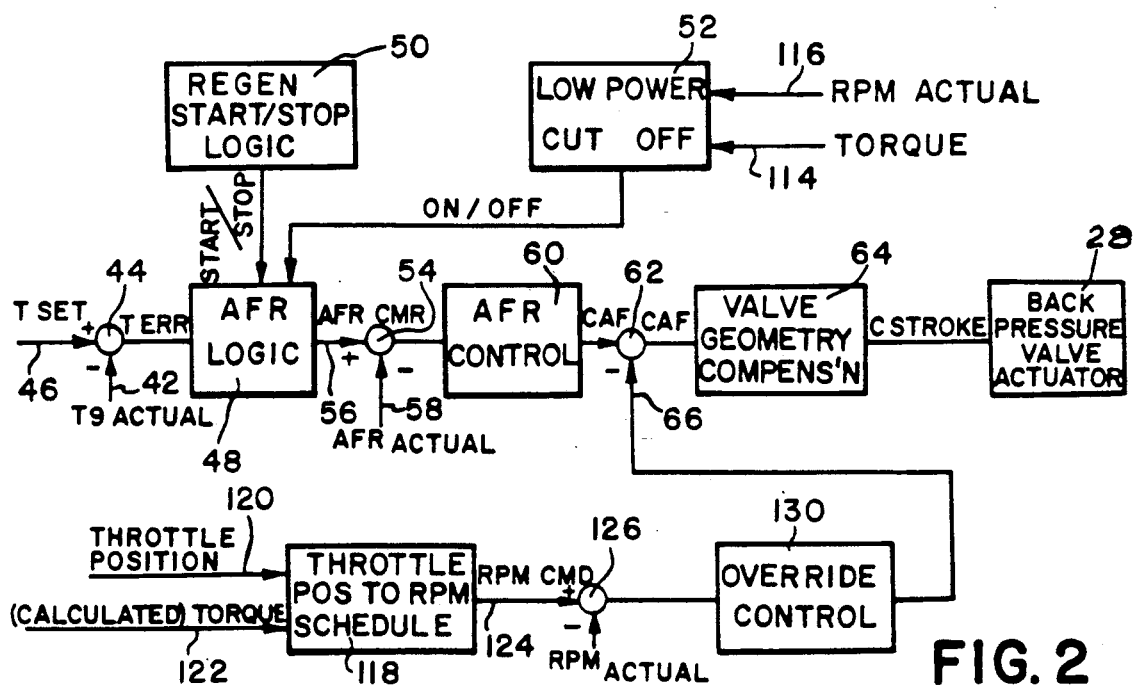
FIG. 2 is a more detailed schematic of a portion of the control system illustrated in FIG. 1.

Referring now to FIG. 2, the manner in which the microprocessor 30 processes the various input signals in order to generate a control signal which is transmitted to the actuator 28 in order to control regeneration of the trap 24 will be described in detail. The signal generated by temperature sensor 34 is fed through input 42 to a summing junction 44 where the actual temperature sensed by the sensor 34 is compared with a preset temperature fed to summing junction 44 through input 46. The set temperature fed through line 46 is high enough to permit efficient regeneration of the trap but low enough to avoid overtemperature of the engine parts or turbocharger. If the temperature is too low, the trap cannot be regenerated. Furthermore, even within the optimum range, if temperatures become too high, damage to the turbocharger or engine components may result. Accordingly, sensor 34 is placed in the warmest part of the system, that is, in the exhaust manifold 14, into which gasses are discharged directly from the engine 10.

Summing junction 44 generates an error signal equal to the difference between the set temperature and the actual temperature sensed by the sensor 34. This error signal is fed into the air/fuel ratio control logic generally indicated by the numeral 48, which will be described in detail hereinafter. The regeneration start/stop logic generally indicated by the numeral 50 is an input to air/fuel ratio control logic and which will also be described in detail hereinafter. Another input to the air/fuel ratio control logic 48 is from low power cut-off logic generally indicated by the numeral 52. The low power cut-off logic 52 will also be described in detail hereinafter.

Air/fuel ratio command logic 48 responds to inputs from summing junction 44, regeneration start/stop logic 50, and low power cut-off logic 52 to generate a commanded air/fuel ratio which is fed to summing junction 54 through input 56. The commanded air/fuel ratio on input 56 must be high enough that engine 10 is run so that sufficient excess oxygen will be provided in the exhaust gas to support combustion of the particulate in the trap 24, but must not be so low as to produce regeneration temperatures within the trap 24 that runaway regeneration will result thus destroying the trap 24. The actual measured air/fuel ratio is fed to summing junction 54 through input 58 or is calculated from other engine parameters as discussed above. The output of summing junction 54 is transmitted through a standard controller 60. The controller 60 may be a conventional proportionalintegral-differential ("PID") controller, or a proportional or lead-lag controller. The controller 60 processes the error signal generated by summing junction 54 into a signal which is transmitted through summing junction 62 into valve geometry compensation network 64. Valve geometry compensation network 64 may be, for example, values stored within memory in the microprocessor 30 which convert the signal received from summing junction 62 into a signal which is adjusted for the characteristics of the backpressure valve 26 in order to linearize the control loop gain. Since the techniques of compensation included within valve geometry compensation network 64 are old and well known to those skilled in the art, they will not be disclosed in detail. The other input 66 of summing junction 62 is generated in response to an engine torque input signal which is calculated from engine parameters and throttle position generated by sensor 40, as will be described in detail hereinafter.

Figure 3:
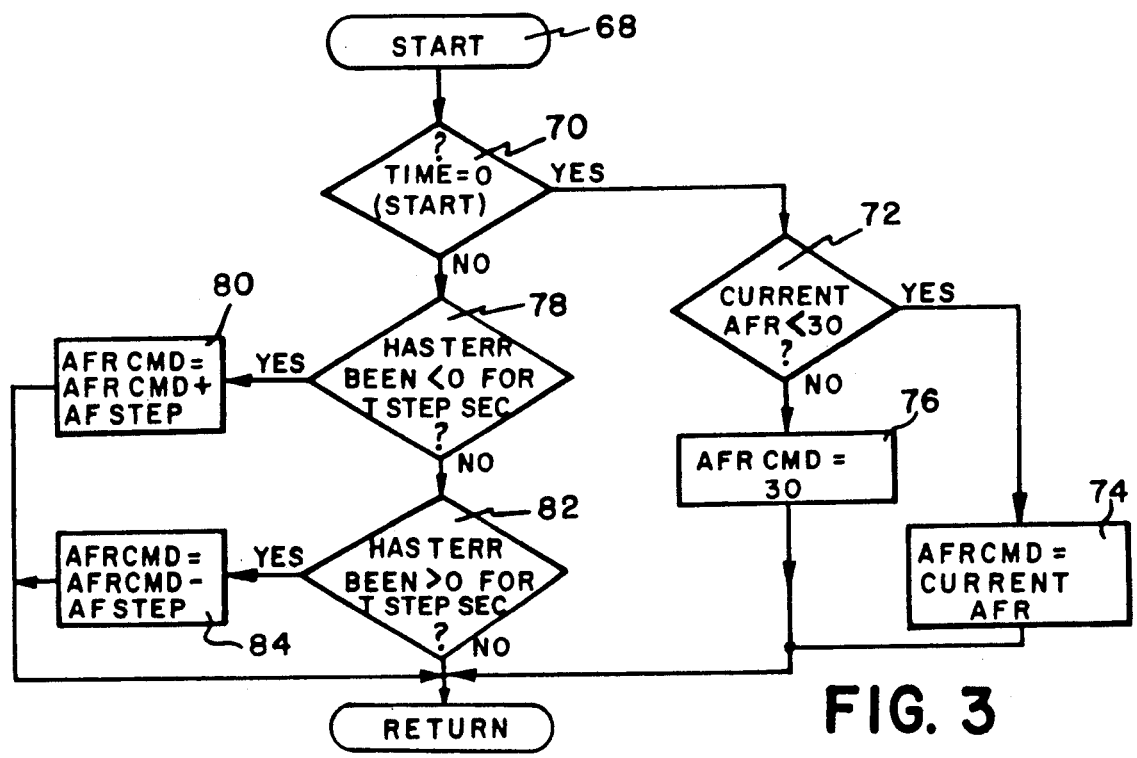
FIGS. 3 and 4 are diagrams of the control logic used in the control illustrated in FIGS. 1 and 2.

Referring now to FIG. 3, the logic within the air/fuel ratio logic control 48 will be described in detail. The logic control 48 responds to a signal from the regeneration start/stop logic 50 as indicated at 68 to begin execution of the program illustrated diagrammatically in FIG. 3. Although not shown in FIG. 3, the controller responds to a signal from low power cut-off 52 at any time during execution of the program or from a signal from start/stop logic 50 to stop regeneration at any time. After air/fuel ratio control logic 48 receives a start command as indicated at 68, the program inquires at 70 as to whether the current execution is the first time the program has been executed in the present regeneration. If it is the first time, the program branches to decision block 72 which determines if the current air/fuel ratio as measured by oxygen sensor 36, is less than an air/fuel ratio of 30. If the current air/fuel ratio is less than 30, the commanded air/fuel ratio transmitted to summing junction 54 is set equal to the current air/fuel ratio, as indicated at 74. If the current air/fuel ratio is not less than 30, the commanded air/fuel ratio transmitted to summing junction 54 is set equal to 30, as indicated at 76. The setting of the initial air/fuel ratio command at an air/fuel ratio of about 30 is done to start the regeneration on a gradual basis. From that setting the air/fuel ratio is slowly ratcheted downward to levels of 18 or 20 which provide required combustion temperature. Achieving temperature gradually prevents damage within the trap by minimizing thermal gradients. The air/fuel ratio set on initially by block 72, 74 and 76 is ratcheted upwardly or downwardly as a function of temperature sensed by temperature sensor 34 to provide optimum regeneration conditions.

If the current execution is not the first time through the program, the program inquires, as indicated at 78, as to whether the error signal generated at summing junction 44, which determines the error between the fixed setpoint of temperature on input 46 and the actual temperature measured by the temperature sensor, has been less than 0 for at least a predetermined time period TSTEP seconds. If the temperature error signal has been less than 0 for at least the minimum time period, the commanded air/fuel ratio transmitted to summing junction 54 is ratcheted upwardly one increment, as indicated at 80 in FIG. 3. The predetermined increment is indicated by the variable "AFSTEP".

If the temperature error signal has not been less than 0 for at least the predetermined time period, the program inquires, as at 82, whether the error signal has been greater than 0 for at least the predetermined time period TSTEP. If the error signal has been greater than 0 for at least TSTEP seconds, the commanded air/fuel ratio transmitted to summing junction 54 is ratcheted downwardly the increment AFSTEP, as indicated at 84. The commanded air/fuel ratio is never ratcheted below a value of 18.

If the temperature error signal has passed through 0 during the preceding TSTEP time period, the commanded air/fuel ratio transmitted to summing junction 54 is neither incremented nor decremented.

Figure 4:
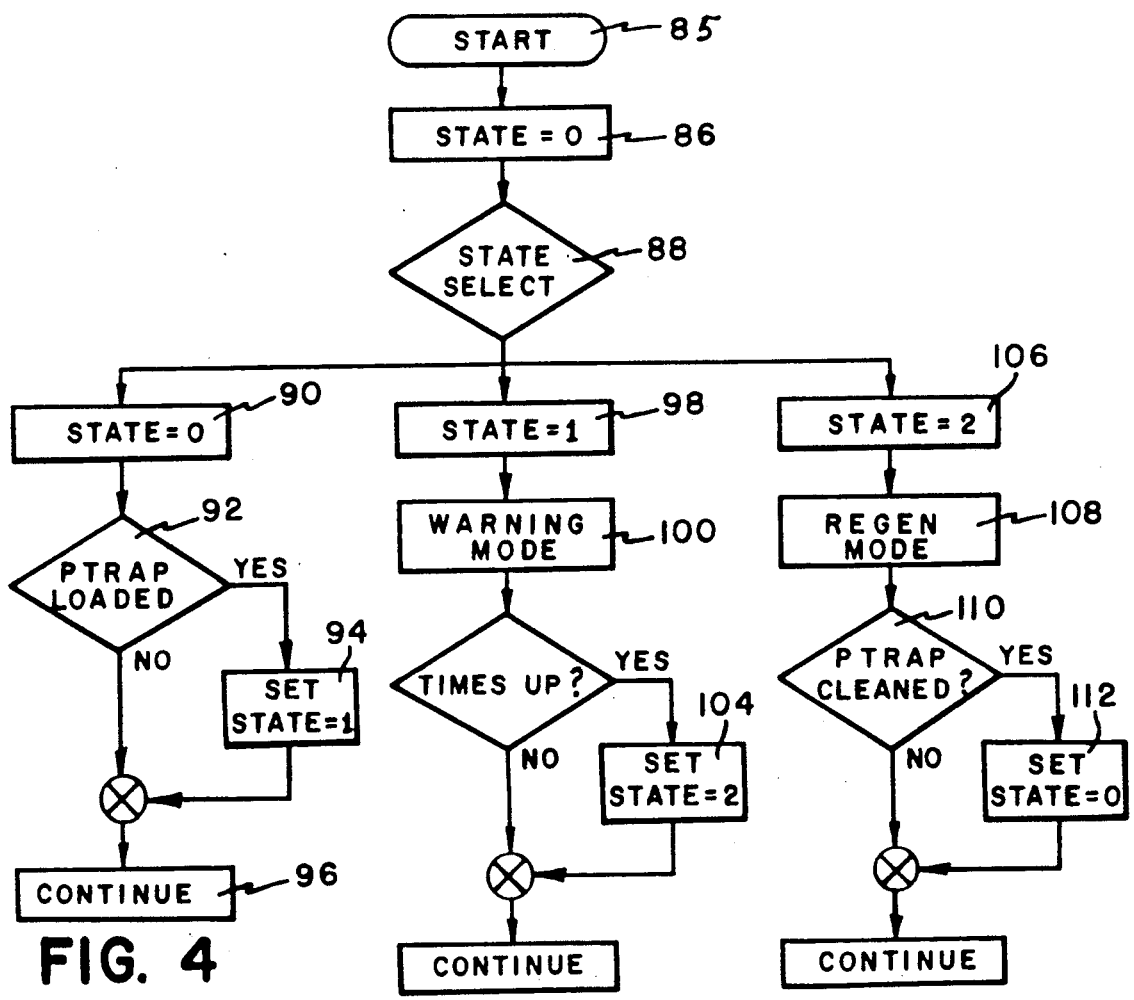

Referring now to the regeneration start/stop logic 50 as illustrated in FIG. 4, the regeneration start/stop logic 50 continually executes the program illustrated schematically in FIG. 4. The program is started as indicated at 84 and sets the variable "STATE" equal to STATE 0 as illustrated at 86. The program then continues to the STATE SELECT decision block 88. Since the STATE has just been set equal to 0, it branches to the the STATE 0 section 90 on the left hand side of the flow chart of FIG. 4. The program then determines if the particulate trap has been loaded or not, as indicated at 92. Depending upon the installation and type of trap, one of several methods may be used to determine if the trap is loaded. The preferred manner is to monitor the fuel flow consumed by the engine. When a predetermined number of pounds of fuel have been consumed, it is assumed that the trap is loaded, and the program branches to set the STATE equal to STATE 1 as indicated at 94. If the trap is not yet loaded, the program continues as indicated at 96 to branch back to the STATE SELECT decision block 88. Other mechanisms for determining if the trap has been loaded include, for example, measuring the pressure drop across the trap by the sensor and comparing the pressure drop with a predetermined maximum pressure drop and initiating regeneration when the actual pressure drop attains the maximum permitted level.

Since drivability may be affected, the driver of the vehicle should be warned before regeneration is initiated. If the STATE has been set as STATE 1 in block 94, the next time through the program proceeds to the STATE 1 phase as indicated at 98. The STATE 1 phase initiates a warning mode as indicated at 100. In the warning mode, an amber light is actuated on the vehicle dashboard for a time period of 30 seconds. At the end of the 30 second warning period, regeneration is initiated, and the amber light is turned off and a green light is turned on. As indicated at 102, the predetermined warning period is tested, and at the end of the warning period the STATE is set equal to 2, as indicated at 104. The program then branches back to the STATE SELECT decision block 88. If the STATE has not been set equal to 2, the program branches back to the STATE 1 portion indicated at 98. However, if the STATE has been set to STATE 2 at 104, the program branches to the STATE 2 section indicated as at 106. Regeneration is then initiated as indicated at 108, by signalling the air/fuel ratio control logic 48 to begin execution of the program illustrated in FIG. 3. The decision block 110 then tests to determine if the trap has been cleaned. A clean trap may be established in a number of ways, the preferred way being to merely time the regeneration period and to regenerate the trap for a fixed time period. Other methods of determining whether or not the trap has been cleaned is to monitor the pressure drop across the trap, such as by monitoring a pressure drop sensor 41 (see FIG. 1), which measures the pressure drop across the trap 24; when the pressure drop is reduced to a satisfactory level, it is assumed that the trap has been cleaned. When a clean trap has been established, the STATE is reset as STATE 0 at 112 and regeneration is terminated by sending a command through the air/fuel ratio control logic 48 to fully open the backpressure valve.

Figure 5:
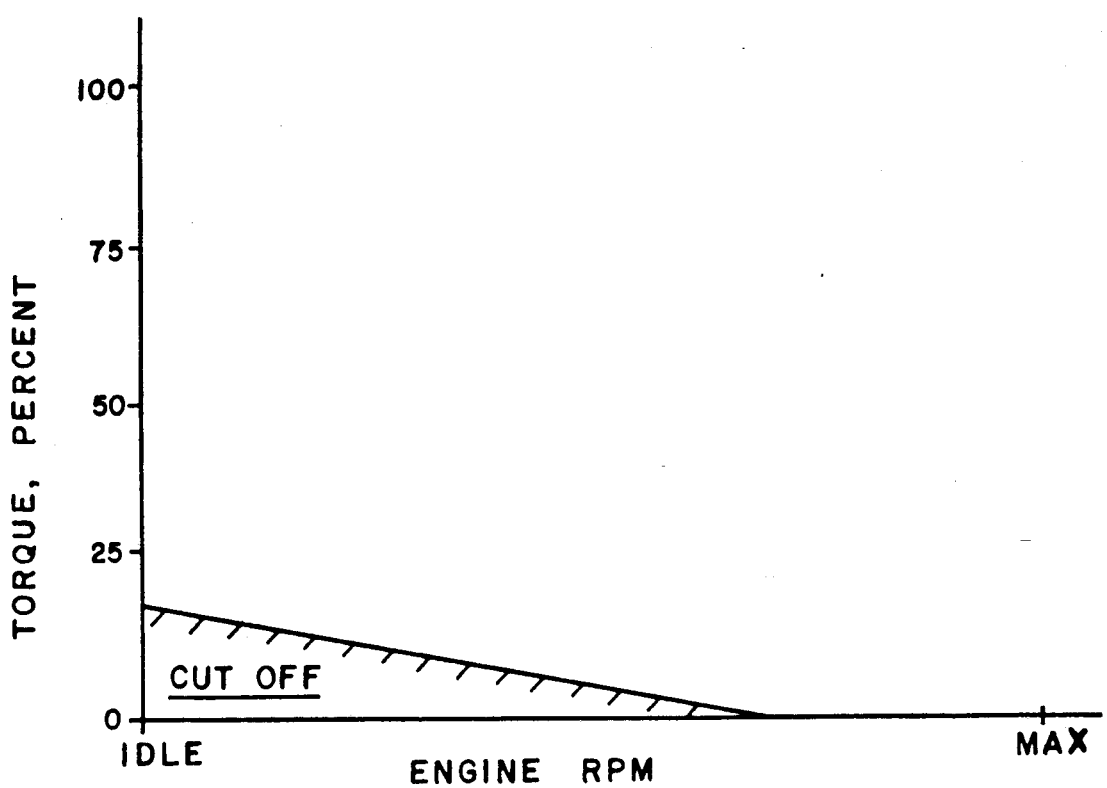
FIG. 5 is a map of percent torque vs. engine speed illustrating the regeneration cut-off area in which regeneration is suspended during low power conditions.

Referring now to FIG. 5, when the vehicle is operated continually at low power conditions, such as engine idle or in very heavy city traffic when the power requirements from the engine are low, it is desirable to suspend regeneration during operation in such low power conditions, as regeneration in such low power conditions will be relatively inefficient. Accordingly, when the vehicle is operated in the cut-off region labeled in FIG. 5, which is a region in which the engine is producing torque less than twenty percent of full torque and an engine speed of roughly sixty percent or less of maximum engine rpm, the low power cut-off control 52 signals the air/fuel ratio logic 48 to suspend regeneration if the vehicle has been operated in the cut-off region illustrated in FIG. 5 for more than a predetermined time period. The low power cut-off control 52 again permits regeneration if the vehicle is operated out of the low power cut-off region of FIG. 5 for a time period in excess of the predetermined time period. The torque is calculated from engine parameters and transmitted to low power cut-off control 52 through input 114, and the engine speed is measured by a sensor 32 illustrated in FIG. 1 and transmitted to low power cut-off control 52 through input 116. The data represented in FIG. 5 may be stored digitally within the low power cut-off control portion 52 of the microprocessor, through values stored in a look-up table which may be accessed in a manner well known to those skilled in the art. The value of torque and speed which define the low power cut-off will vary with engine type. Instead of using torque, fuel rate (in lb/pump stroke or cc/pump stroke) could be measured and used to determine a cut-out region where regeneration is suspended.

Figure 6:
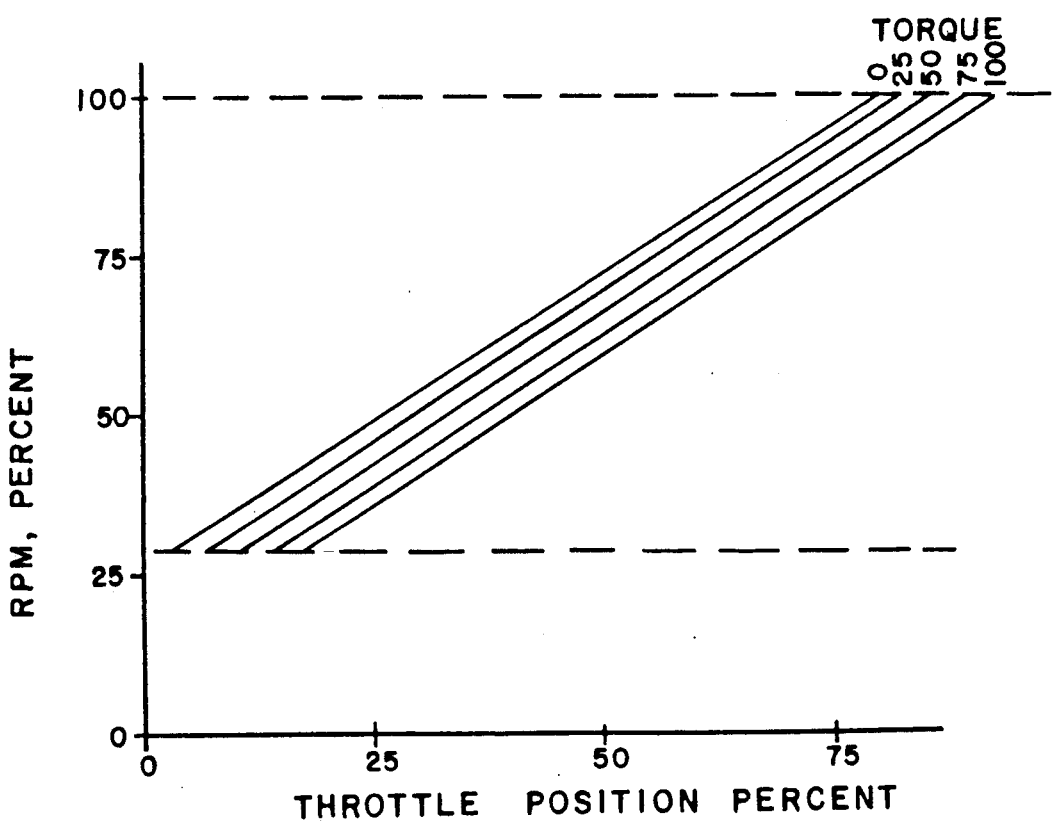
FIG. 6 is a map of the governor characteristics of a typical diesel engine governor of the type used on an engine having a particulate trap regeneration system according to the system illustrated in FIGS. 1 and 2.

Although, as described above, the driver is warned before regeneration is initiated, the system must respond correctly to demands from the driver for increased power in order to avoid potentially dangerous situations. Referring to FIG. 6, the characteristics of the governor which controls the engine 10 are illustrated graphically. Accordingly, if the throttle position and torque output of the engine are known, the commanded engine speed can be calculated. The data represented graphically in FIG. 6 are stored in the throttle position to rpm schedule 118 in FIG. 2. Throttle position is sensed by the sensor 40 and transmitted to schedule 118 on input 120, and torque output of the engine is calculated from engine parameters and transmitted to schedule 118 through input 122. The data illustrated in FIG. 6 may be stored digitally within schedule 118 in any convenient manner, such as through a look-up table with necessary interpolation between values stored in the table provided by conventional interpolative routines. Accordingly, a commanded engine speed is transmitted to input 124 of summing junction 126. The actual engine speed measured by engine speed sensor 32 is transmitted to summing junction 126 through input 128. The difference between the commanded and the actual engine speed is transmitted to a conventional controller 130, which may be a proportional-integral-differential (PID) controller, a lead-lag controller, a proportional controller, or a washout function. The controller 130 generates an output signal in relation to the commanded rpm which is transmitted to input 66 of the summing junction 62. Accordingly, the output of the air/fuel ratio controller 60 is overridden by the output of the throttle override controller 130. When the engine no longer requires power and the driver reduces the commanded engine speed by releasing the throttle, controlled regeneration is resumed by the controller 60. The actual time during which the controller 130 overrides the air/fuel ratio controller 60 is usually short and has little negative effect on the regeneration in progress.

A feature of this control that can be provided is one that rapidly opens the back pressure valve whenever the fuel input is increased and then more gradually brings it back to its air/fuel ration control position when the fuel rate stops increasing. This enhances the response of the engine to load increases or demands for acceleration. By opening the valve the gas and air flow is increased so that the turbocharger accelerates rapidly and full engine torque is available more quickly.

What is claimed is:

1. Method of regenerating an exhaust gas particulate trap in an exhaust system for an internal combustion engine, comprising the steps of measuring the air/fuel ratio of said internal combustion engine, generating a signal representing a commanded value of the air/fuel signal corresponding to an air/fuel ratio with sufficient excess air to burn the particles stored in the trap, generating an error signal representing the difference between the measured air/fuel ratio and the commanded value of the air/fuel ratio, and controlling the air/fuel ratio of said engine as a function of said error signal, said exhaust system including a valve for regulating exhaust gas flow through said system to thereby vary the backpressure on said engine, said step of controlling the air/fuel ratio of the engine including the step of operating said backpressure valve in response to said error signal to thereby control said air/fuel ratio by controlling the backpressure on said engine.

2. Method of regenerating an exhaust gas particulate trap as claimed in claim 1, wherein said method includes the steps of measuring the temperature of the exhaust gas of said engine, and using exhaust gas temperature to modify the commanded value of the air/fuel ratio.

3. Method of regenerating an exhaust gas particulate trap as claimed in claim 2, wherein said engine includes an exhaust manifold, a turbocharger having an exhaust gas inlet connected to said manifold, and an exhaust gas outlet connected to said particulate trap, said step of measuring the temperature of said exhaust gas being effected by measuring the temperature of said exhaust gas in said manifold.

4. Method of regenerating an exhaust gas particulate trap as claimed in claim 2, wherein said engine includes an exhaust gas manifold, said exhaust gas system being connected to said manifold, said step of measuring the temperature of said exhaust gas being effected by measuring the temperature of said exhaust gas in said manifold.

5. Method of regenerating an exhaust gas particulate trap as claimed in claim 2, wherein said method includes the steps of comparing the measured value of the exhaust gas temperature with a predetermined reference temperature calculating a temperature error signal equal to the difference between the measured exhaust gas temperature and the reference signal, and increasing or decreasing the commanded value of the air/fuel ratio as a function of the temperature error signal.

6. Method of regenerating an exhaust gas particulate trap as claimed in claim, 5, wherein said method includes the steps of increasing said commanded value of the air/fuel ratio by a predetermined magnitude if the temperature signal exceeds a predetermined level and decreasing the commanded value of the air/fuel ratio by a predetermined magnitude if the temperature signal is less than a predetermined value.

7. Method of regenerating an exhaust gas particulate trap as claimed in claim 6, wherein said method includes the steps of measuring consecutive time periods of a predetermined length, and increasing or decreasing said commanded air/fuel ratio by said predetermined amount no more than once each such time period.

8. Method of regenerating an exhaust gas particulate trap as claimed in claim 5, wherein said method includes the steps of setting an initial level of said commanded value of the air/fuel ratio equal to a predetermined level if the measured value of the air/fuel ratio is greater than said predetermined level and setting the initial level of said commanded value of the air/fuel ratio equal to the measured value of the air/fuel ratio when regeneration of said trap is initialed if the measured value of the air/fuel ratio is less than said predetermined level.

9. Method of regenerating an exhaust gas particulate trap as claimed in claim 2, wherein said method includes the steps of setting an initial level of said commanded value of the air/fuel ratio equal to a predetermined level if the measured value of the air/fuel ratio is greater than said predetermined level and setting the initial level of said commanded value of the air/fuel ratio equal to the measured value of the air/fuel ratio when regeneration of said trap is initiated if the measured value of the air/fuel ratio is less than said predetermined level.

10. Method of regenerating an exhaust gas particulate trap as claimed in claim 2, wherein said method includes the steps of monitoring the power output fuel rate of said internal combustion engine, and suspending regeneration of said trap when said engine is operated under low power conditions.

11. Method of regenerating an exhaust gas particulate trap as claimed in claim 10, wherein said method includes the steps of monitoring the torque output and engine speed of said engine, and suspending regeneration of said particulate trap if the torque output and engine speed are within a predetermined low power cut-off range.

12. Method of regenerating an exhaust gas particulate trap as claimed in claim 11, wherein said step of suspending regeneration of said trap takes place only after torque output or fuel rate and engine speed are within said low power cut-off range for a predetermined time period, and again permitting regeneration when said torque output and engine speed remain out of said low power cut-off range for at least a period of time equal to the predetermined time period.

13. Method of regenerating an exhaust gas particulate trap as claimed in claim 2, wherein said method includes the steps of determining if the driver is requesting increased engine power, and overriding regeneration, when increased power is requested.

14. Method of regenerating an exhaust gas particulate trap as claimed in claim 13, wherein the step of determining if the engine is being operated under high power demand conditions includes the steps of measuring throttle position and engine torque or fuel rate, using the throttle position and engine torque or fuel rate to determine a commanded engine speed, comparing commanded engine speed with actual engine speed, and overriding the air/fuel ratio control when commanded engine speed and actual engine speed are in a predetermined relationship with one another.

15. Method of regulating an exhaust gas particulate trap in an exhaust system for an internal combustion engine, said exhaust system including a backpressure valve for regulating flow of exhaust gas through the exhaust system whereby backpressure on the engine may be regulated by operation of the valve, comprising the steps of determining a commanded value of the air/fuel ratio of said engine providing sufficient excess oxygen to effect regeneration of the trap, modifying the commanded value of the air/fuel ratio as a function of exhaust gas temperatures, and operating said backpressure valve to vary backpressure on said engine to achieve the commanded air/fuel ratio.

16. Method of regenerating an exhaust gas particulate trap as claimed in claim 15, wherein said method includes the steps of setting an initial level of said commanded value of the air/fuel ratio equal to a predetermined level if the measured value of the air/fuel ratio exceeds said predetermined level and setting the initial level of said commanded value of the air/fuel ratio equal to the measured value of the air/fuel ratio when regeneration of said trap is initialed if the measured value of the air/fuel ratio is less than said predetermined level.

17. Method of regenerating an exhaust gas particulate trap as claimed in claim 15, wherein said method includes the steps of determining when said particulate trap requires regeneration, monitoring the power output of said internal combustion engine, and suspending regeneration of said trap when said engine is operated under low power conditions.

18. Method of regenerating an exhaust gas particulate trap as claimed in claim 17, wherein said method includes the steps of monitoring the torque output or fuel rate and engine speed of said engine, and suspending regeneration of said particulate trap if the torque output or fuel rate and engine speed are within a predetermined low power cut-off range.

* * * * *